Nov. 22, 1960  T. MILLER ET AL  2,961,190
GUIDED MISSILE CONTROL DEVICE
Filed July 13, 1953  3 Sheets-Sheet 1
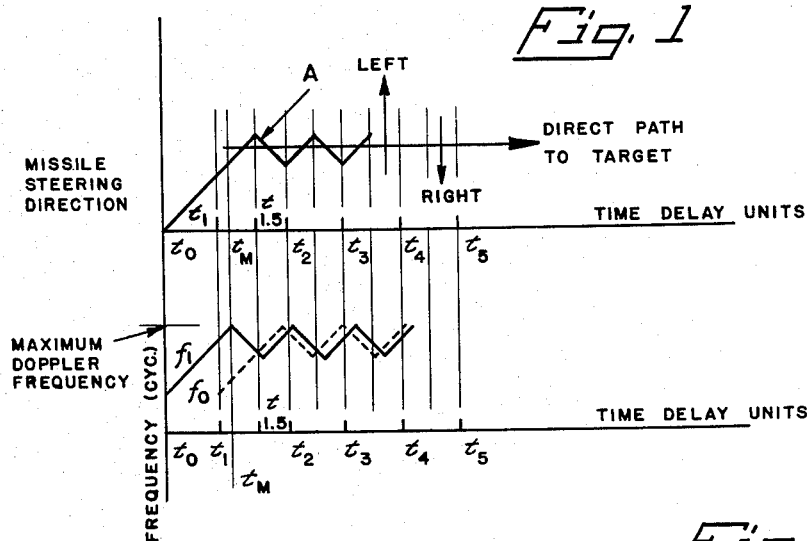
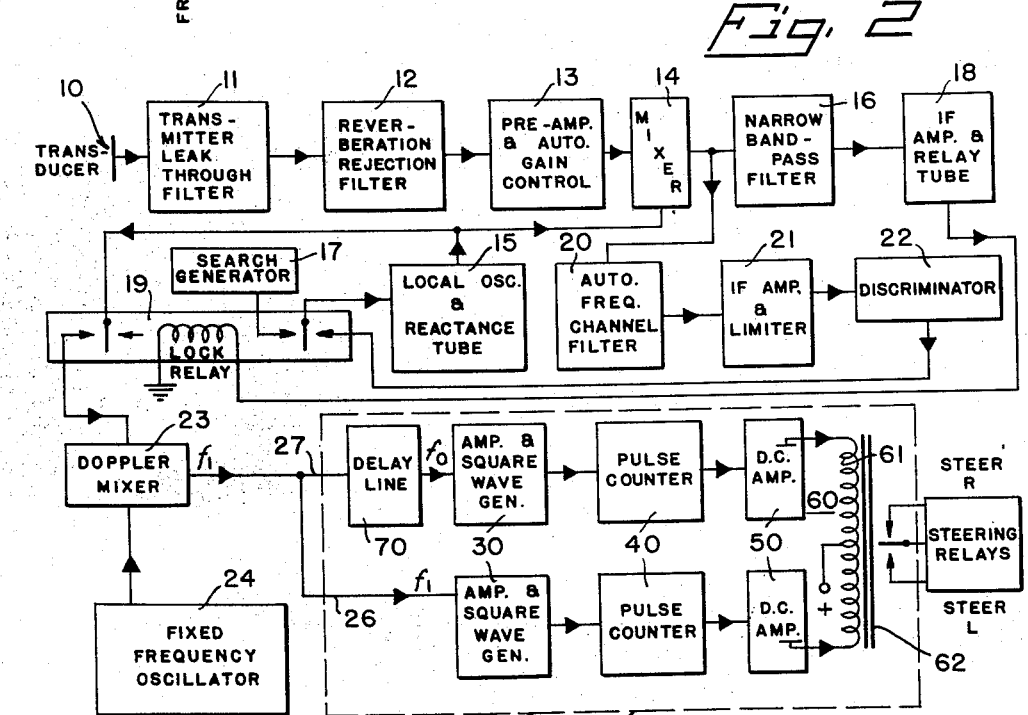
INVENTORS,
THEADORE MILLER
ARTHUR NELKIN
CHARLES P. CONLEY
BY
ATTORNEYS.

Nov. 22, 1960  T. MILLER ET AL  2,961,190
GUIDED MISSILE CONTROL DEVICE
Filed July 13, 1953  3 Sheets-Sheet 3

INVENTORS.
THEADORE MILLER
ARTHUR NELKIN
CHARLES P. CONLEY
BY
ATTORNEYS.

United States Patent Office 2,961,190
Patented Nov. 22, 1960

2,961,190

GUIDED MISSILE CONTROL DEVICE

Theadore Miller, Los Angeles, Calif., and Charles P. Conley and Arthur Nelkin, Pittsburgh, Pa., assignors, by mesne assignments, to the United States of America as represented by the Secretary of the Navy Filed July 13, 1953, Ser. No. 367,400

6 Claims. (Cl. 244—14)

This invention relates to a guided missile control system and more particularly to a frequency change or Doppler effect detection circuit for an echo ranging missile, wherein variations in the frequency of the reflected target signal serves to actuate a missile steering mechanism.

Missile guidance circuits for controlling a missile steering device in response to reflected target signals have, in the past, employed highly directive lobing methods so as to compare signal response, either in magnitude or phase, due to various lobe positions of the antenna or transducer and thus derive an error signal to be used for direction control purposes. The apparatus for accomplishing such lobing methods requires a rather complex system including a transducer or radiating element having either a movable lobe or beam pattern or several beam patterns to produce a plurality of reflected target signals which may be compared in sequence. Elaborate circuitry is required to interpret the results of these comparisons and to generate a correcting signal to minimize, or reduce to zero, the difference in signal response resulting from various lobe positions or from the several beam patterns. The magnitude of the correcting signal provides a means for maintaining the missile on a collision course with the target.

The present system, which is intended primarily to effect azimuth control but which, if desired, may be employed for elevation control, proposes to eliminate difficulties arising from the complexity of the prior missile guidance systems by providing a relatively simple system, for controlling the direction of travel of a missile in azimuth, for example, involving use of the "Doppler effect."

According to the Doppler principle the apparent or Doppler frequency of a received signal is affected by any relative movement of the transmitter and receiver; the greater the rate of decrease in the distance between the transmitter and receiver the greater will be the apparent, or Doppler, frequency. Thus, in an echo ranging missile wherein a signal of relatively high frequency energy is transmitted and a target echo, or a reflected target signal, therefrom is received, the Doppler frequency of the reflected signal will be dependent upon the relative closing speed between the target and the missile, the target echo possessing a maximum Doppler frequency when the missile is headed directly toward the target. Any deviation of the missile from a true course toward the target will result in a reduced Doppler frequency of the reflected signal inasmuch as the relative closing speed of the missile and target is thereby decreased.

The present invention, which is based upon this fact that the target echo possesses a maximum Doppler frequency when the missile is pointed directly at the target, proposes to recognize and utilize the sense or direction of Doppler frequency changes, which result from torpedo deviations from a direct course to the target, to generate a correcting voltage which may operate, for example, the missile azimuth steering mechanism to redirect the missile in azimuth toward the target. The present system provides a dual channel frequency change detection circuit with a phase shift or time delay in one of the channels whereby the frequency of the target echo at one time may be compared with the frequency of a prior target echo to determine the direction of frequency change, if any. Means are provided for deriving a signal representative of this determination for energizing a missile steering system to guide the missile in accordance therewith.

Accordingly, it is an object of the present invention to provide a guided missile control system to steer an echo ranging missile toward a desired target.

Another object is to provide a frequency change detector to determine increases or decreases in the frequency of a target echo for directing the attack of a missile.

Yet another object is to provide a missile guidance system wherein the direction of the missile toward a target is controlled by changes in the frequency of target echo signals.

And still another object is to provide a missile guidance system for controlling in azimuth the attack course of a missile toward a target in response to a signal derived from changes in the frequency of the target echo signal.

Other objects and many of the attendant advantages of this invention will be readily appreciated as the same becomes better understood by reference to the following detailed description when considered in connection with the accompanying drawings wherein:

Fig. 1 is a graph schematically portraying the changes effected in Doppler frequency by variations in the direction in azimuth of a missile toward a target and the corrective effect of a signal derived from the comparison of a present echo signal with an echo signal which has been delayed for a predetermined time delay interval;

Fig. 2 is a block diagram of a missile azimuth guidance system including the directivity control circuit which forms the basis of the present invention.

Figure 3A:
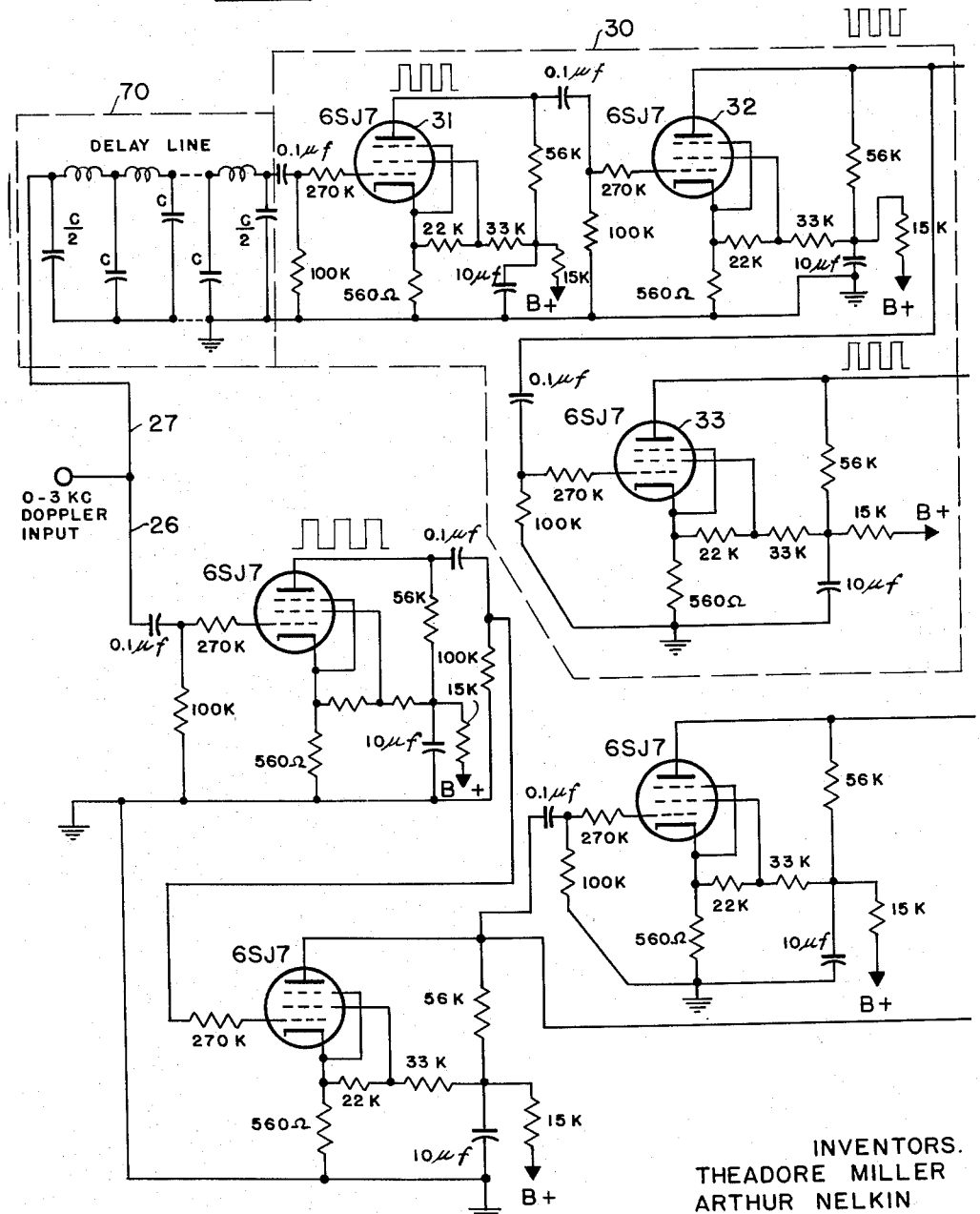
Figs. 3a and 3b disclose a circuit schematic of the directivity control diagram shown in Fig. 2.

Referring now to the drawings and more particularly to Fig. 2, there is illustrated a missile guidance system incorporating a directivity control circuit, in accordance with the present invention. While the drawings and following description relate, for purposes of illustration only, to a missile azimuth control system, it should be understood that the invention may be applied as well to a missile elevation control system. This system includes a "lock-up" circuit, which, after a particular target signal has been selected, maintains the system responsive to that signal to the exclusion of all others, and the directivity control circuit 25, shown enclosed by dotted lines, which is responsive to signals derived from the "lock-up" circuit to guide the missile in azimuth toward the selected target in a manner hereinafter described. The "lock-up" circuit includes a transducer 10, for receiving a target reflected signal originally generated and transmitted by conventional apparatus (not shown) contained within the missile. The acoustic energy received by the transducer 10 is comprised of a target echo signal which changes in frequency, owing to the Doppler effect, in accordance with the relative closing speed of the missile and target, and various extraneous signals principally due to reverberations in the medium in which the missile travels. The "lock-up" circuit further includes a transmitter leak-through filter 11 and a reverberation rejection filter 12 in order to prevent the system from locking on either leak-through or reverberation signals. The filtered target echo signal is then amplified and limited in amplitude by a preamplifier and automatic gain control circuit 13 whereupon it passes into mixer 14, which may be of any of the well-known types. The target echo signal is here mixed with the output from a local oscillator 15 to provide a resultant heterodyned target signal at an intermediate frequency having a value within the limits of a narrow band pass filter 16.

The desired heterodyned target signal is obtained by first sweeping the local oscillator 15 through a range of frequencies equivalent in width to the frequency variations expected from the incoming signal. This is accomplished by a search generator 17 acting through a reactance tube which controls the output frequency of local oscillator 15 and causes it to sweep through the desired frequency band at any desired cyclical rate. When the difference between the frequencies of the incoming reflected signal and the output signal of the local oscillator falls within the limits of narrow band pass filter 16, the resultant signal will pass through filter 16 to the intermediate frequency amplifier and relay tube circuit 18 where it acts to cut off the plate current in the relay tube and thereby de-energize lock relay 19, switching control of the local oscillator from the sweeping search generator 17 to discriminator 22 (whereupon local oscillator 15 varies in frequency in accordance with the Doppler frequency of the target echo signal), and also connecting the output signal of local oscillator 15 to the remaining circuitry for automatic steering control as will appear.

In addition to the channel from mixer 14 to the narrow band pass filter 16 a second channel is provided from the mixer to an automatic frequency control circuit comprising an automatic frequency channel filter 20, an intermediate frequency amplifier and limiter 21, and a crystal discriminator 22. The output of the discriminator 22 is a D.C. voltage the magnitude of which is substantially proportional to the frequency deviation of the mixer output signal from the center frequency of the narrow band pass filter 16.

Upon the de-energizing of lock relay 19 by relay tube circuit 18, control of the output frequency of local oscillator 15 is switched from the search generator 17 to the automatic frequency control circuit whereby the output of the discriminator is applied to the grid of the reactance tube in the local oscillator circuit so as to maintain the difference between the frequency of the incoming signal and the frequency of the local oscillator signal within the range of the narrow band pass filter 16. The receiver is thus in effect locked on the target signal.

Simultaneously with the switching of control of local oscillator 15 from the sweep generator 17 to the automatic frequency control circuit, lock relay 19 also operates to complete a circuit from the local oscillator to Doppler mixer 23, which in turn is supplied, from a second oscillator 24, with a signal having a fixed frequency equal to the lowest local oscillator 15 frequency, whereby the local oscillator output signal of varying frequency is mixed with the output signal of oscillator 24 to provide a Doppler mixer output signal, the varying frequency of which is commensurate with the variations in frequency in the target echo produced by the Doppler effect. This Doppler mixer signal is then fed into the directivity control circuit 25, further detailed in Figs. 3a and 3b.

Figure 3B:
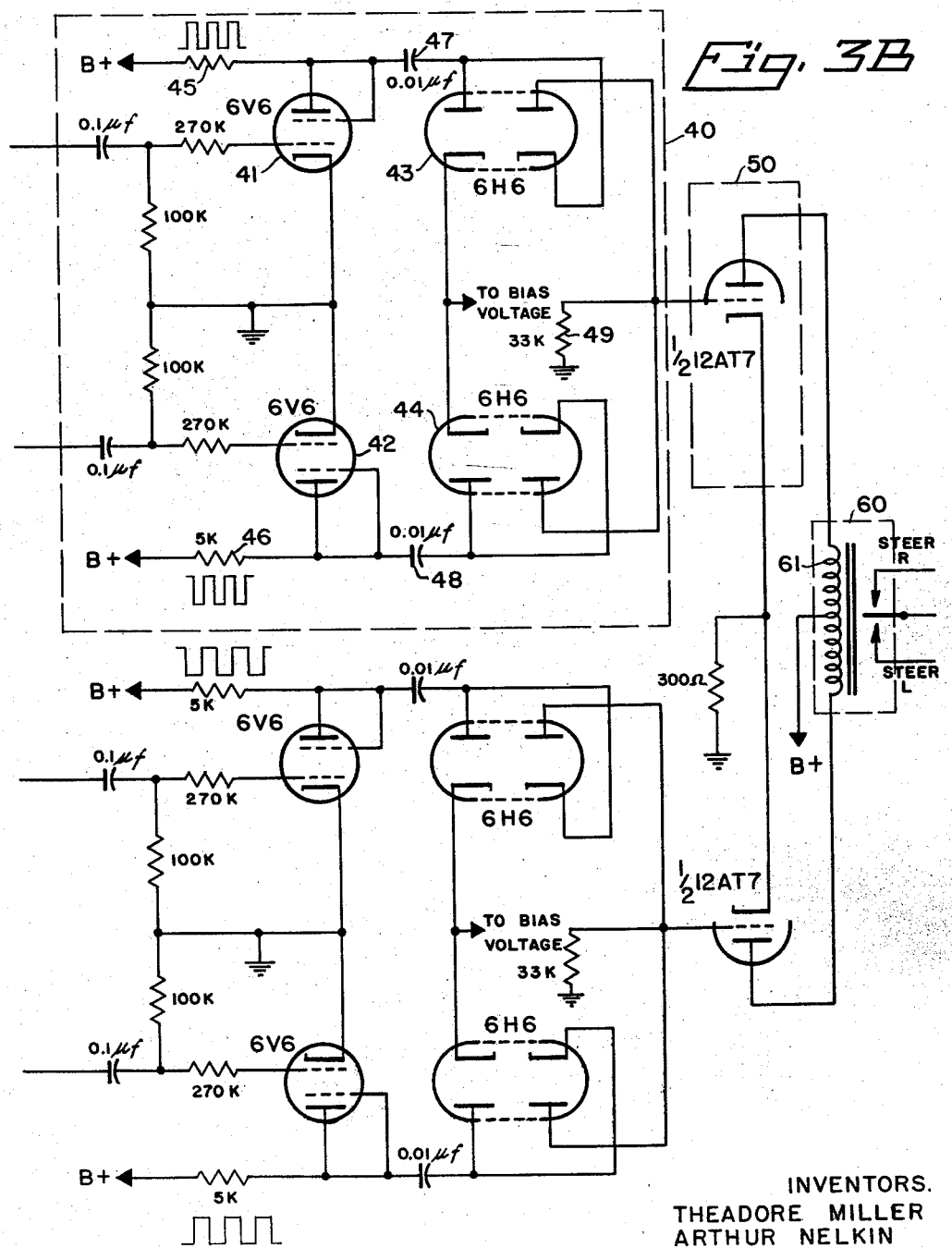

The directivity control circuit is comprised of two parallel branches 26 and 27 to enable a frequency comparison to be made of the instantaneous and delayed mixer signals represented in Figs. 1 and 2 as $f_1$ and $f_0$ respectively, for the purpose of deriving a correcting signal to be applied to the missile azimuth steering mechanism whereby the missile can be directed toward the target. Each of the channels 26 and 27, which form frequency counting circuits, comprises an amplifier and square wave generator 30, a pulse counter 40, and a D.C. amplifier 50, the output of each channel being fed into opposite ends of a center-tapped coil 61 in polarized relay 60 for differential operation thereof. Channel 27 further includes a delay line 70 whereby the portion of the Doppler mixer signal which passes through to squaring circuit 30 of channel 27 is delayed in time, for a period substantially equivalent to the time delay unit $t$ of Fig. 1, relative to the portion of the signal which passes through channel 26. Thus on being fed into the directivity control circuit 25 the Doppler mixer signal branches off into the two channels 26 and 27 whereupon the portion of the signal passing through to squaring circuit 30 of channel 27 is delayed in time by delay line 70. Except for the delay line the circuits comprising the two channels 26 and 27 are identical, and, therefore, the remainder of the directivity control will be described by reference to channel 27 only, it being understood that channel 26 can be described in the same manner. The Doppler mixer signal after being time delayed by line 70 is fed into the amplifier and square wave generator 30 comprising three overdriven amplifier tubes 31, 32 and 33 (Fig. 3a) to obtain the desired sensitivity. The plate of amplifier tube 32 is connected to the grid of amplifier 33 and to the grid of switching tube 41 through appropriate coupling condensers, and the plate of amplifier 33 is connected to the grid of switching tube 42 through a coupling condenser, all as shown in Figs. 3a and 3b, whereby a square wave, having a frequency commensurate with the target Doppler frequency, is fed to each of the switching tubes, one of which waves is 180 degrees out of phase with the other. The switching tubes 41 and 42 and the rectifier tubes 43 and 44 together with their coupling condensers and resistors comprise the pulse counter 40 of Fig. 2. At each half cycle, regulated current is switched from one load resistor 45 to the other load resistor 46 in the switching tube circuits, the switching action being made rapid by the application of a large enough square wave voltage to the grids of the switching tubes to drive them to cutoff. Coupling condensers 47 and 48, connected between the switching tubes 41 and 42 and rectifier tubes 43 and 44, are alternately charged and discharged to produce current pulses, having a recurrence frequency proportional to the target Doppler frequency, which are rectified by tubes 43 and 44, the R.C. constants of the circuits being such that the current pulses decrease substantially to zero before the next cycle occurs. The rectification of these current pulses by tubes 43 and 44, which have their plates and cathodes connected in the manner shown in Fig. 3b, results in an average value of current flow through resistor 49 which value increases as the pulse recurrence frequency increases and decreases as this frequency decreases, thereby producing in resistor 49 a varying D.C. voltage having a magnitude proportional to the number of pulses per second which in turn is proportional to the target Doppler frequency. This D.C. voltage is applied to the control grid of D.C. amplifier 50, the plate of which is connected to one of the sections of the coil 61 of polarized relay 60 whereby the current flowing to said coil section is determined by the D.C. voltage developed across resistor 49 and hence by the Doppler frequency of the reflected signal.

Referring again to both branches of the directivity control circuit, as in Fig. 2, it is seen that the plates of the D.C. amplifiers 50 in the two channels are connected to opposite ends of the polarized relay coil, the center of said coil being connected to a source of positive voltage whereby the actuation of the missile azimuth steering mechanism to steer left or right is dependent upon the relative magnitudes of the currents flowing in the plate circuits of the D.C. amplifiers and is determined by the resultant of the corresponding opposed currents in relay coil 61.

The operation of the above described missile guidance system is as follows:

During a period of searching for the target, the transmitter within the missile (not shown) transmits a signal of relatively high frequency energy into the medium in which the missile travels along its search course and the local oscillator 15, controlled by the search or sweep generator 17 acting through the reactance tube, sweeps through a range of frequencies equivalent in width to the Doppler frequency variations expected from the reflected target signal. The local oscillator signal is fed into mixer 14 to be mixed with any incoming signal. At some instant after contact is made with the target and the echo therefrom is received, the difference in frequency between the incoming signal and the local oscillator signal will be within the range of narrow band pass filter 16, whereupon the receiver locks on the target signal by switching control of the local oscillator from the sweep generator to the automatic frequency control circuit in the manner previously described. A portion of the local oscillator signal is now fed into the Doppler mixer to provide a directivity control circuit input signal possessed of a frequency commensurate with the Doppler frequency of the incoming signal.

Referring now to Fig. 1 wherein there is illustrated a composite graph in which the upper curve A schematically represents the azimuth track traversed by a missile which incorporates the present invention, and in which the lowermost curves $f_0$ and $f_1$ each exhibit variations in Doppler frequency of the received target echo resulting from the deviations of a missile heading from the true target heading as the missile moves along the track represented in the upper curve A of the graph. In the lowermost graph the solid, or $f_1$, line represents the undelayed signal, the broken, or $f_0$, line represents the delayed signal, and $t_0$ represents a point of time at which the receiver locks on an appropriate target echo, at which time the missile may initially be headed to the right of the direct path to the target, so assumed in the following illustration. At time $t_0$ the reflected target signal, possessing a certain Doppler frequency as depicted by the intersection of the $f_1$ line with the $t_0$ axis, is fed into the two channels 26 and 27 of the directivity control circuit. The missile steering mechanism, responsive to the current produced in the relay coil as a result of the signal passing through the undelayed channel 26, causes the missile to steer left, as represented in the upper half of the composite graph. Upon left steering of the missile, the relative closing speed of the target and missile will increase, if the target is initially to the left of the missile as in the instance illustrated, resulting in an increasing Doppler frequency of the incoming reflected signal, as shown by the $f_1$ line of Fig. 1, so that the missile continues to swing left. During the period of left steering the Doppler frequency of the target echo will continue to increase until point of time $t_M$ is reached, the time at which the missile, while still turning left, is headed substantially toward the target. As shown, the target echo signal $f_1$ then begins decreasing in frequency while delayed signal $f_0$ as applied to squaring circuit 30 in channel 27 begins increasing in frequency, the frequency of delayed signal $f_0$ becoming greater than that of signal $f_1$ after time $t_{1.5}$ is reached, and the resultant current applied to the relay coil thus causing the missile to then steer toward the right as indicated.

As indicated in Fig. 1, the size of the delay line is such that the signal passing through to squaring circuit 30 of channel 27 is delayed for a period of time equivalent to the interval $t_0$–$t_1$ and consequently at point of time $t_1$ the delayed signal, $f_0$ in Fig. 1, is at the same frequency as that of the target echo when first received. Signal $f_0$ causes a current in relay coil 61 opposed to that produced by the undelayed signal, but, since during the period $t_0$–$t_1$ the undelayed signal frequency $f_1$, has increased, the resultant of the current produced in the relay coil is such that the missile continues to steer left. Left turning of the missile beyond the point of time $t_M$ of maximum Doppler frequency results in a decreasing relative closing speed and hence in diminishing Doppler frequencies. In this interim, however, the delayed signal frequency $f_0$ is increasing and after time $t_{1.5}$ the voltage due to the delayed signal $f_0$ becomes greater than the voltage due to the undelayed signal $f_1$ whereupon the direction of the resultant of the currents produced in the relay coil 61 is reversed and the missile steering mechanism is actuated to cause the missile to steer right as shown in the upper half of the composite graph. At point of time $t_2$ the frequency of the delayed signal $f_0$ again becomes less than the frequency of the instantaneous target echo $f_1$ and the missile again steers left. Thus the missile oscillates about the direct path to the target in the manner represented in Fig. 1.

The operation of the present invention as described assumes instantaneous missile control and action. In actual practice, a control device of this nature is possessed of an inertia time lag but it has been found that this invention will operate satisfactorily to track down a target even under a condition where missile control and action is delayed by inertia for a time equal to approximately one-half the time delay interval $t$.

Obviously many modifications and variations of the present invention are possible in the light of the above teachings. It is therefore to be understood that within the scope of the appended claims the invention may be practiced otherwise than as specifically described.

What is claimed is:

1. In a homing missile having means for steering it in arcuate paths under command of control signals, and signal receiving means for providing an output signal corresponding to a received signal arising from a selected target, wherein said target and output signals are characterized by a Doppler frequency which varies, during execution of a missile turn, with deviation of said missile from a heading directed toward said target, in combination therewith, a first control circuit channel for deriving from said output signal a first control signal of magnitude corresponding to the Doppler frequency of said target signal as currently received, a second control circuit channel, including signal delay means, for deriving from said output signal a second control signal of magnitude corresponding to the Doppler frequency of said target signal as received at an earlier instant substantially determined by the value of lag time imposed by said signal delay means, whereby, as the missile executes an initial turn in a predetermined direction which swings it toward and past said heading, a condition of first sense obtains wherein said first control signal remains greater in magnitude than said second control signal but only until the missile has turned past said heading for a period substantially corresponding to said lag time, whereupon a condition of second sense is initiated wherein said second control signal is greater in magnitude than said first control signal, and means for controlling said steering means under command of said control signals during said condition of first sense to steer the missile in said turn of predetermined direction, and under command of said control signals during said condition of second sense to steer the missile in a turn of opposite direction, whereby said condition of second sense continues until the missile, in its opposite turn, in like manner swings past said heading for a period substantially corresponding to said lag time, said conditions of first and second sense being alternately repetitive and said missile being steered along a sinuous course directed toward said target.

2. A homing missile combination as defined in claim 1, wherein said receiving means is of superheterodyne type comprising a local oscillator, under control of a frequency-following circuit, for heterodyning said received signal to a substantially fixed intermediate frequency, and wherein the local oscillator signal serves as said output signal.

3. A homing missile combination as defined in claim 1, wherein each said channel includes wave-shaping means for operating upon the output signal applied thereto and for deriving therefrom a square-wave signal of like frequency, pulse counting means for operating upon said square-wave signal and for deriving therefrom a unidirectional signal of magnitude corresponding to the frequency of said square-wave signal, and a D.C. amplifier controlled by said unidirectional signal to provide said control signal in the form of a relay energizing current of magnitude corresponding to that of said unidirectional signal, and wherein said steering means includes a differential relay having opposed windings to which are applied the relay energizing currents delivered by said channels.

4. A homing missile as defined in claim 2, wherein each said channel includes wave-shaping means for operating upon the output signal applied thereto and for deriving therefrom a square-wave signal of like frequency, pulse counting means for operating upon said square-wave signal and for deriving therefrom a unidirectional signal of magnitude corresponding to the frequency of said square-wave signal, and a D.C. amplifier controlled by said unidirectional signal to provide said control signal in the form of a relay energizing current of magnitude corresponding to that of said unidirectional signal, and wherein said steering means includes a differential relay having opposed windings to which are applied the relay energizing currents delivered by said channels.

5. A homing missile for use in attacking a target, comprising: means for continuously providing a first control signal having a characteristic varying with the Doppler frequency of a target signal as currently received and for simultaneously providing a second control signal having a like characteristic varying with the Doppler frequency of said target echo signal as received at an instant earlier by a predetermined time interval; steering means controllable to steer the missile in arcuate paths; and means responsive to said control signals, and to the differential characteristic of said second control signal referred to said first control signal, for controlling said steering means to yield a sinuous missile course comprised of arcuate turns alternating in direction in accordance with the changing sense of said differential characteristic.

6. A homing missile as defined in claim 5, wherein said means for providing control signals includes a target signal receiver of superheterodyne type comprising a local oscillator, under control of a frequency following circuit, for heterodyning said received signal to a substantially fixed intermediate frequency, and wherein said control signals are derived from the output signal delivered by said local oscillator, said output signal varying in frequency in accordance with variation of target signal Doppler frequency.

References Cited in the file of this patent

UNITED STATES PATENTS

| | | |
|---|---|---|
| 2,408,742 | Eaton | Oct. 8, 1946 |
| 2,614,249 | Eaton | Oct. 14, 1952 |
| 2,632,159 | Cunningham | Mar. 17, 1953 |
| 2,638,586 | Guanella | May 12, 1953 |
| 2,707,233 | Norton | Apr. 26, 1955 |